May 22, 1956 R. E. SCOTT 2,746,288
SPRING TESTING SCALE
Filed July 24, 1953 2 Sheets-Sheet 1
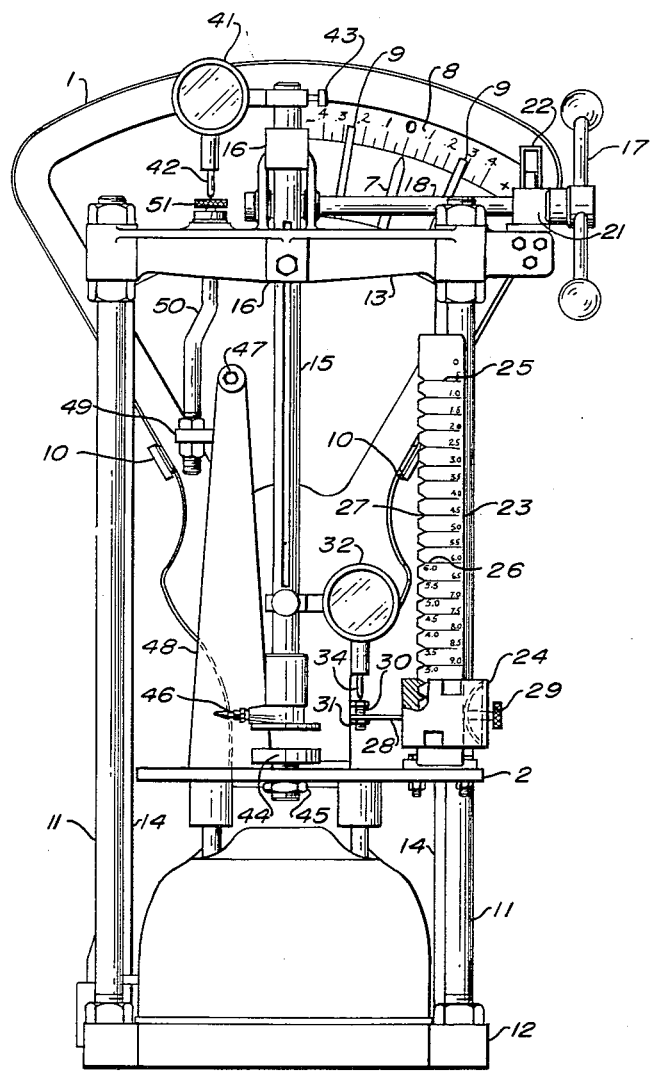
Fig. I
INVENTOR.
ROBERT E. SCOTT
BY
Marshall, Marshall & Veasting
ATTORNEYS May 22, 1956        R. E. SCOTT        2,746,288
SPRING TESTING SCALE
Filed July 24, 1953        2 Sheets-Sheet 2
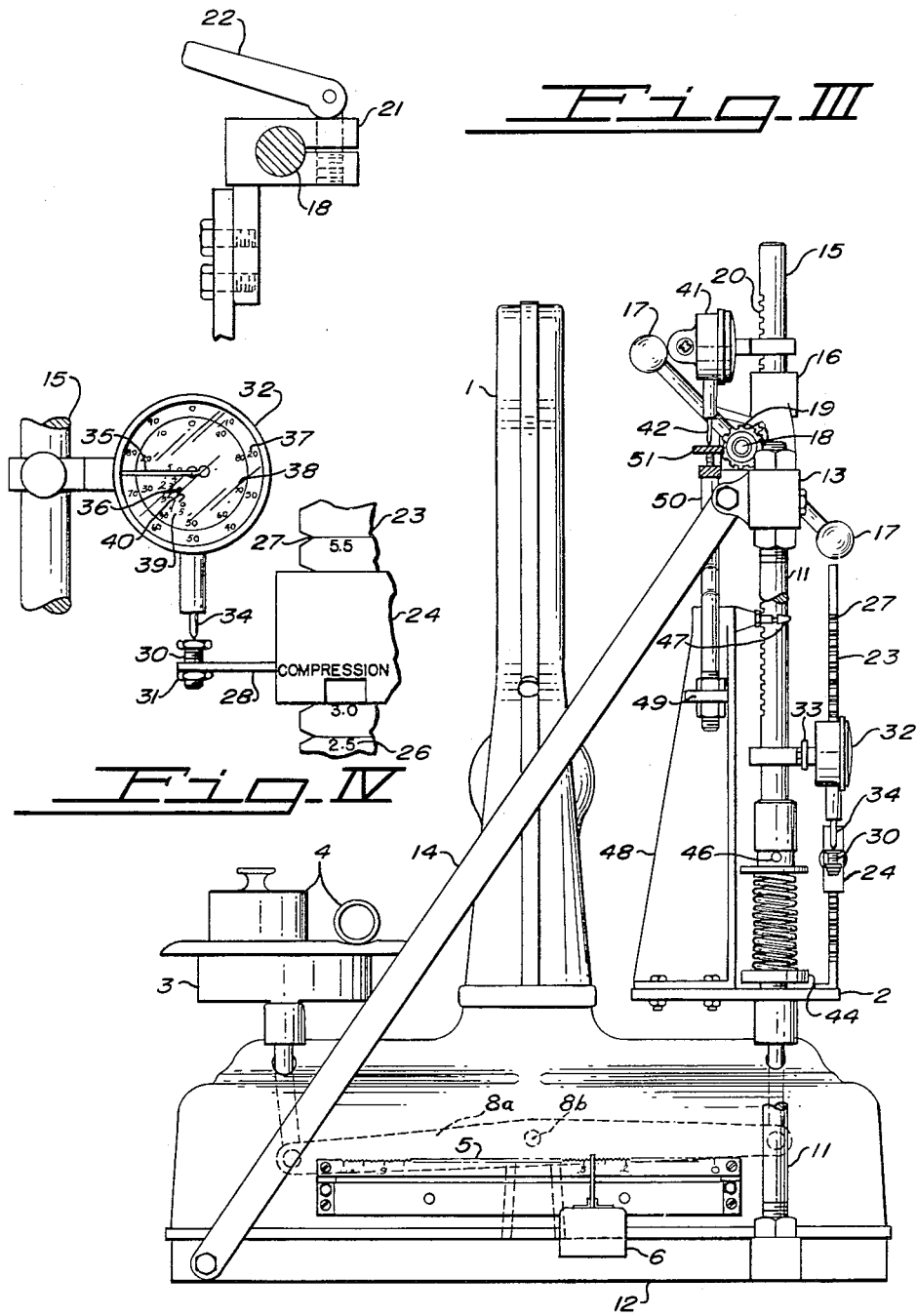
INVENTOR.
ROBERT E. SCOTT
BY
*Marshall, Marshall & Heating*
ATTORNEYS

United States Patent Office 2,746,288
Patented May 22, 1956

2,746,288

SPRING TESTING SCALE

Robert E. Scott, Toledo, Ohio, assignor to Toledo Scale Company, Toledo, Ohio, a corporation of New Jersey Application July 24, 1953, Serial No. 370,048

11 Claims. (Cl. 73—94)

This invention relates to a machine for testing elastic materials, such as compression and tension springs, and more particularly to force measuring devices in the form of weighing scales especially adapted to determine the force necessary to change the free length of such a material to an arbitrary length.

It is necessary that compression and tension springs, when used in certain devices and compressed or extended to a given length, shall exert a given force. The predominating stress of such springs is caused by a stress in the material from which the spring is made. Variation in the material, such as its heat treatment or composition, or in the free length, wire size, and diameter of the spring will produce variation in the force needed to compress or extend the spring to a given length. Since springs, although formed on the same automatic machine, vary from each other in one or more of the foregoing respects, it is necessary to sort the springs into several groups according to their stress characteristics. Weighing scales of ordinary types, equipped with means to support and stress springs, are employed for this purpose. Although such scales are well adapted to measure and indicate the force of springs within prescribed tolerances, they are not well adapted to quickly and accurately determine and indicate the stress in springs in relation to several arbitrary test lengths.

Heretofore, spring testing devices in the form of weighing scales have been preset for stressing springs to arbitrary lengths by using separate test links and separate gauge blocks for each test length. Thus, as many expensive test links and gauge blocks were needed as the number of test lengths that were set up on the machine. In addition to the expense of these numerous test links and gauge blocks, the numerous presettings of the machine for various test lengths were time consuming. Furthermore, it was necessary in machines equipped to test both tension and compression springs to adjust the machines each time a changeover was made from one type of testing to the other.

The principal object of the invention is to provide length measuring equipment for positioning a loading ram according to the specified test length of a specimen while adjusting an over and under deflection indicator for such specimen length.

A further object of the invention is to provide for independent adjustment of one of the specimen supporting members in order that the length measuring equipment shall apply for either compression or tension testing.

Another object of the invention is to provide for the quick and accurate setting up of test lengths to .001 inch for tension and compression spring testing.

These and other objects and advantages will be apparent from the following description of a preferred form of the invention.

According to the invention an improved force measuring device for testing an elastic material at a specified length comprises a base, a frame mounted on the base, a lever fulcrumed on the base, a force receiver supported by one arm of the lever, a counterweight receiver supported by the other arm of the lever, indicating means operatively connected to the receivers, a loading ram mounted on said frame for movement toward and away from the force receiving side of said force receiver, means for reciprocating the ram to stress the material between the ram and the force receiver, and means for presetting the length at which the material is to be tested comprising a graduated bar mounted perpendicularly from the force receiving side of the force receiver and parallel to the ram and a stepwisely adjustable slider cooperating with the graduations to determine the major portion of the test length, and gauge means mounted on the ram and cooperating with the slider to determine the minor portion of the test length of the material.

A preferred embodiment is illustrated in the accompanying drawings.

In the drawings:

Figure I is a front elevational view of the improved spring testing machine.

Figure II is a side elevational view of the improved spring testing machine, showing diagrammatically a lever fulcrumed on the base of the machine.

Figure III is an enlarged detail view of a lock used to selectively prevent movement of a ram, the movement of which ram stresses the spring during the test.

Figure IV is an enlarged detail view of gauge means mounted on the ram and showing the cooperation of said gauge means with a stepwisely adjustable slider.

Referring to the drawings in detail:

The testing machine for testing springs and similar elastic articles includes force measuring equipment in the form of a weighing scale adapted to support one end of a specimen being tested and separately mounted means for applying force to the specimen. The force measuring means or weighing scale, as specifically shown in the drawings, includes a weighing scale 1 having a load receiver 2, a counterweight receiver 3 adapted to receive counterbalance weights 4 (Figure II) one of which is a duplicate of a specimen being tested, a graduated beam 5 carrying a poise 6, and an indicator 7 operatively connected to the receivers 2 and 3 and cooperating with a graduated chart 8. The load receiver 2 and the counterweight receiver 3 are supported by the opposite arms of a lever 8a fulcrumed at 8b on the base of the weighing scale 1, as shown in Figure II. Load tolerance indicators 9 are adjustably positioned adjacent the graduated chart 8 for visually indicating allowable tolerances in load. The load tolerance indicators 9 are adjusted by manipulation of control knobs 10 located on the sides of the indicator housing.

In operation, the counterweights 4 are placed on the counterweight receiver 3 and the poise 6 positioned on the graduated beam 5 until the combined weight of the counterweights and the weight effect of the poise equals the tare weight of the specimen to be tested plus the theoretical test stress of the specimen. The indicator 7 indicates the over or under stress deviations from the theoretical test stress of the specimen when the specimen is extended or compressed to the test length.

Means for loading the specimen includes a framework having vertical parallel side-rods 11 erected from a base 12 and passing closely adjacent the sides of the load receiver 2. The upper ends of the vertical side-rods 11 are joined by a fixedly located crosshead 13 and the side-rods 11 are stabilized by diagonal braces 14 connected between the ends of the crosshead 13 and the end of the base 12 remote from the vertical side-rods 11.

A ram 15, adapted to apply force to the specimen, is driven vertically through guide bearings 16 of the crosshead 13 by force applied manually to a ball ended handle or crank 17 and transmitted through a shaft 18 carrying a pinion 19 meshing with a rack 20 cut in the side of the ram 15. The ram may be locked in any position by a combination bearing and brake 21 (Figure III) which when its handle 22 is set locks the shaft 18.

Means for determining on the machine the major portion of the test length of the specimen includes a notched and graduated bar 23 mounted on the load receiver 2 to extend parallel to the ram 15, a stepwisely adjustable slider 24 slidable on the bar 23 and cooperating with tension length graduations 25, compression length graduations 26, and notches 27 on the bar. The adjustable slider 24 may be locked in desired position by tightening a thumb-screw 29. The slider 24 has a laterally extending arm 28 equipped with an anvil headed stud 30 secured by a lock-nut 31.

Means for determining on the machine the minor portion of the test length of the specimen includes a micrometer dial height gauge 32 slidable on the ram 15 which dial gauge is maintained in desired position on the ram by tightening a clamping-screw 33. When the ram 15 is moved towards the load receiver 2, a stem 34 of the dial gauge 32 engages the head of the stud 30. As shown in enlarged detail in Figure IV, upward movement of the height gauge stem 34 causes a long indicator 35 to rotate clockwise one or more revolutions and a short indicator 36 to rotate counterclockwise a fractional part of a revolution; downward movement of the height gauge stem 34 causes the indicators 35 and 36 to reverse the direction of their travel. The long indicator 35 cooperates with a clockwise row of tension length indicating indicia 37 and with a counterclockwise row of compression length indicating indicia 38, while the short indicator 36 cooperates with a counterclockwise row of tension length indicating indicia 39 and with an inner clockwise row of compression length indicating indicia 40. Five complete revolutions of the long indicator 35 indicates .500 inch of travel of the height gauge stem 34, the maximum range of the gauge. The short indicator 36 counts the number of revolutions made by the long indicator.

The means just described permits test lengths to be set up on the machine quickly and accurately to .001 inch for tension and compression testing and eliminates the need for as many test links and gauge blocks as the number of test lengths. For the convenience of the operator, so that the test length indication may be observable closely with the force measuring indication, the test length when determined can be transferred, as hereinafter described, to a positionable over-and-under deflection indicator 41 slidable on the upper portion of the ram 15 and having a stem 42 which indicator is maintained in desired position on the ram by tightening a clamping-screw 43.

Means for supporting the specimen includes an adjustable platen 44 carried by the load receiver 2 and maintained in desired position by tightening a lock-nut 45, a first tension specimen supporting pin 46 rigidly attached to the lower end of the ram 15, and a second tension specimen supporting pin 47 rigidly attached to the top of a bracket 48 mounted on the load receiver 2 parallel to the ram 15.

An anvil 51 adjustably mounted from the upper end of an upwardly directed extension 50 of the bracket 48, which extension 50 is mounted on an arm 49 of the bracket, cooperates with the stem 42 of the deflection indicator 41.

When the ram 15 is positioned according to a specified test length of a specimen, the over-and-under deflection indicator 41 may be roughly adjusted for such specimen length by sliding the deflection indicator on the ram 15 until the stem 42 of the deflection indicator engages the anvil 51, and by turning the anvil 51 for fine adjustment of the indicator 41.

In initially setting up the testing machine to test tension and compression springs, a weight of convenient size, e. g. a five pound weight, is placed on the counterweight receiver 3 and a Master three inch test link is hooked over and between the tension specimen supporting pins 46 and 47. The ram 15 is run down until tension stress on the test link operating through the bracket 48 moves the load receiver 2 down slightly to take play out of the operating mechanism of the weighing scale 1. The ram 15 is locked in place by pulling down the handle 22, as shown in detail in Figure III, and the adjustable slider 24 is moved along the notched and graduated bar 23 until the top of the slider is even with the three inch graduation in the row of tension length graduations 25, and the thumb-screw 29 is tightened to hold the slider in locked position. The height gauge 32 is moved along the ram until its stem 34 engages the head of the stud 30 enough to push the stem slightly up causing the height gauge 32 to read approximately zero on the clockwise row of tension length indicating indicia 37 and on the counterclockwise row of tension length indicating indicia 39, and the clamping-screw 33 is tightened to hold the height gauge in locked position. The height gauge 32 is made to read exactly zero by adjusting the anvil-headed stud 30, the ram 15 is unlocked, and the Master test link is removed.

A one inch gauge block is then placed on the adjustable platen 44 and the adjustable slider 24 is moved along the notched and graduated bar 23 until the bottom of the slider is even with the one inch graduation in the row of compression graduations 26, and the slider thumb-screw 29 is tightened. Then the ram 15 is run down until it engages the gauge block and the load receiver 2 moves down slightly to again take play out of the operating mechanism of the weighing scale 1, and the ram 15 is locked. The adjustable platen 44 is adjusted up or down until the height gauge stem 34 is pushed in and the height gauge 32 reads exactly zero on the series of counterclockwise compression length indicating indicia 38 and on the clockwise row of compression length indicating indicia 40.

No tests links or gauge blocks are needed in subsequent testing. The adjustable slider 24 cooperating with the graduations on the notched and graduated bar 23 along with the cooperating height gauge 32 take the place of the numerous test links and height gauges heretofore used in spring testing. Furthermore, the independent adjustment of the specimen supporting platen 44 allows the foregoing described preset length measuring equipment to apply for either compression or tension testing.

The testing procedure for compression springs is as follows: The weight of convenient size, previously placed on the counterweight receiver 3 during the initial presetting of the testing machine, is allowed to remain. The adjustable slider 24 is moved on the notched and graduated bar 23 so that the bottom of the slider is even with the graduation mark in the row of compression length graduations 26 which is the nearest one half inch below the desired test length of the spring. For example, if the desired test length is 3.225 inches, the adjustable slider 24 is positioned, as shown in Figure IV, so that the bottom of the adjustable slider indicates 3.0 inches, and the slider thumb-screw 29 is tightened. The minor portion of the test length of the spring, i. e. 0.225 inch, is determined by running the loading ram 15 down until the height gauge 32 indicates, on the compression length indicating indicia 38 and 40, 0.225 inch, as shown in Figure IV, i. e. the short indicator 36 indicates that the long indicator 35 has made two revolutions or 0.2 inch and the long indicator 35 is positioned between the 20 and 30 mark in the counterclockwise row of compression length indicating indicia 38. The ram is then locked. The foregoing determined test length can be transferred to the over-and-under deflection indicator 41, for the convenience of the operator who then can easily observe both the test length measurement indication shown on the deflection indicator 41 and the force indication shown on the closely adjacent weighing scale chart 8, by moving the deflection indicator 41 on the ram 15 until the stem 42 of the indicator 41 engages the anvil 51 and the indicator reads approximately zero. The deflection indicator clamping-screw 43 is tightened and the anvil 51 is turned for fine adjustment until the over-and-under deflection indicator 41 reads exactly zero. The slider 24 is moved, out of the way, to its lowest position, the ram 15 unlocked, and the weight removed from the platform. The testing machine is now ready to test compression springs having a test length of 3.225 inches.

A duplicate of the spring to be tested is placed on the counterweight receiver 3 as a tare weight, and test weights are placed on the counterweight receiver 3 to equal the major part of the test stress of the spring to be tested and the poise 6 is moved along the beam 5 to equal the minor part of the test stress of the spring. The load tolerance indicators 9 are set, over and under, by turning their control knobs 10, the spring to be tested is placed on the adjustable platen 44, and the ram 15 is run down until the over-and-under deflection indicator 41 reads zero. The weighing scale indicator 7 will then indicate the over or under stress deviation from the theoretical test stress of the spring as the spring is compressed to the test length determined to .001 inch. Repeated tests can be made on similar test length springs by raising the ram 15, removing the tested spring, placing a spring to be tested on the adjustable platen 44, and lowering the ram 15 until the deflection indicator 41 again reads zero.

As hereinbefore mentioned, no change-over of the testing machine is required when changing from compression to tension testing or vice versa. The testing procedure for tension springs is very similar to the procedure hereinbefore described for compression springs and is as follows:

A weight of convenient size, e. g. the same weight used in initially setting up the machine, is placed on the counterweight receiver 3 and the adjustable slider 24 is moved on the notched and graduated bar 23 so that the top of the slider 24 is even with the graduation mark in the row of tension length graduations 25 which is the nearest one half inch below the desired test length of the spring to determine the major portion of the test length, and the slider thumb-screw 29 is tightened. The minor portion of the test length is determined by running the ram 15 down until the height gauge 32 indicates, on the tension indicia 37 and 39, the difference between the foregoing slider setting and the desired test length, and the ram 15 is locked. The foregoing determined test length is transferred to the over and under deflection indicator 41 as hereinbefore described in connection with compression testing. The adjustable slider 24 is moved, out of the way, to its lowest position, the ram 15 is unlocked, and the weight removed from the counterweight receiver 3. The testing machine is now ready to test tension springs having the test length determined on the machine.

A duplicate of the spring to be tested is placed on the counterweight receiver 3 as a tare weight, test weights placed on the counterweight receiver, the poise 6 moved along the beam 5, and the load tolerance indicators 9 positioned as hereinbefore described in connection with compression testing. The loading ram 15 is raised, the spring to be tested is hooked over and between the tension specimen supporting pins 46 and 47, and the ram 15 is lowered to stress the spring until the over-and-under deflection indicator 41 reads zero. The weighing scale indicator 7 will then indicate the over or under stress deviation from the theoretical test stress of the spring as the spring is extended to the test length determined to .001 inch. Repeated tests can be made on similar test length springs by raising the ram 15, unhooking the tested spring, hooking a spring to be tested over and between the tension specimen supporting pins 46 and 47 and lowering the ram 15 until the deflection indicator 41 again reads zero.

Various modifications and changes in the details of construction may be made without departing from the scope of the invention.

Having described the invention, I claim:

1. In a force measuring device for testing an elastic material at a specified length, in combination, a base, a frame mounted on the base, a lever fulcrumed on the base, a force receiver supported by one arm of the lever, a counterweight receiver supported by the other arm of the lever, indicating means operatively connected to the receivers, a ram mounted on said frame for movement toward and away from the force receiving side of said force receiver, means for reciprocating the ram to stress the material between the ram and the force receiver, and means for presetting the length at which the material is to be tested comprising a graduated bar mounted perpendicularly from the force receiving side of the force receiver and parallel to the ram and an adjustable slider cooperating with the graduations to determine the major portion of the test length, and gauge means mounted on the ram and cooperating with the slider to determine the minor portion of the test length of the material.

2. A device according to claim 1 in which the means mounted on the ram and cooperating with the slider comprises a dial indicator.

3. In a force measuring device for testing an elastic material at a specified length, in combination, a base, a frame mounted on the base, a lever fulcrumed on the base, a force receiver supported by one arm of the lever, a counterweight receiver supported by the other arm of the lever, indicating means operatively connected to the receivers, a ram mounted on said frame for movement toward and away from the force receiving side of said force receiver, means for reciprocating the ram to stress the material between the ram and the force receiver, and means for presetting the length at which the material is to be tested comprising a graduated bar mounted perpendicularly from the force receiving side of the force receiver and parallel to the ram and an adjustable slider cooperating with the graduations to determine the major portion of the test length, gauge means mounted on the ram and cooperating with the slider to determine the minor portion of the test length of the material, and an adjustable platen mounted on said force receiver to finally position said slider with respect to said gauge means when said stress is a compressive stress.

4. In a force measuring device for testing an elastic material at a specified test length, in combination, a base, a frame mounted on the base, a lever fulcrumed on the base, a force receiver supported by one arm of the lever, a counterweight receiver supported by the other arm of the lever, indicating mechanism operatively connected to said receivers, a ram mounted on said frame for movement toward and away from the force receiving side of said force receiver, means for reciprocating the ram to compress the material between the ram and the force receiver, and means for presetting the length at which the material is to be tested comprising a graduated bar mounted perpendicularly from the force receiving side of the force receiver and parallel to the ram and an adjustable slider cooperating with the graduations to determine the major portion of the test length, and gauge means mounted on the ram and cooperating with the slider to determine the minor portion of the test length of the material.

5. In a force measuring device for testing an elastic material at a specified test length, in combination, a base, a frame mounted on the base, a lever fulcrumed on the base, a force receiver supported by one arm of the lever, a counterweight receiver supported by the other arm of the lever, indicating mechanism operatively connected to said receivers, a ram mounted on said frame for movement toward and away from the force receiving side of said force receiver, means for reciprocating the ram to compress the material between the ram and the force receiver, means for presetting the length at which the material is to be tested comprising a graduated bar mounted perpendicularly from the force receiving side of the force receiver and parallel to the ram and an adjustable slider cooperating with the graduations to determine the major portion of the test length, gauge means mounted on the ram and cooperating with the slider to determine the minor portion of the test length of the material, and an adjustable platen mounted on said force receiver to finally position said slider with respect to said gauge means.

6. In a force measuring device for testing an extensible material at a specified length, in combination, a base, a frame mounted on the base, a lever fulcrumed on the base, a force receiver supported by one arm of the lever, a counterweight receiver supported by the other arm of the lever, indicating means operatively connected to the receivers, a ram mounted on said frame for movement toward and away from the force receiver, a bracket mounted from said receiver parallel to the ram, said ram being reciprocable in the direction in which forces are normally applied to said force receiver, means carried on the bracket remote from the force receiver and means carried on the end of the ram nearest the force receiver for supporting the material to be tested, means for reciprocating the ram toward the receiver to extend the material supported between the means on the bracket and the means on the ram, and means for presetting the length at which the material is to be tested comprising a graduated bar mounted perpendicularly from the force receiving side of the force receiver and parallel to the bracket and an adjustable slider movable along the bar and cooperating with the graduations to determine the major portion of the test length, and means mounted on the ram and cooperating with the slider to determine the minor portion of the test length of the material.

7. In a device for measuring the force exerted through a material when the length of the material is changed from its free length, in combination, a base, a frame mounted on the base, a lever fulcrumed on the base, a force receiver supported by one arm of the lever, a counterweight receiver supported by the other arm of the lever, indicating means operatively connected to the receivers, a member mounted for reciprocation with respect to the force receiver toward and away from the force receiving side of the force receiver to change the length of the material being tested, means for reciprocating the member, a graduated bar mounted from said force receiver parallel to the reciprocable member, an adjustable slider movable along the bar and cooperating with the graduations, and an indicating member carried on the reciprocable member and adapted to engage the slider, said indicating member, slider, and graduated bar being adapted to preset the distance between the force receiver and the reciprocable member to correspond to the length at which the material is to be tested, said bar and slider determining the major portion of the test length and said indicating member engaging said slider determining the minor portion of the test length of the material.

8. A device according to claim 7 in which the indicating member comprises a dial indicator having a stem adapted to engage the slider.

9. In a device for measuring the force exerted through a material when the length of the material is changed from its free length, in combination, a base, a frame mounted on said base, a lever fulcrumed on the base, a force receiver supported by one arm of the lever, a counterweight receiver supported by the other arm of the lever, indicating means operatively connected to the receivers, a member mounted on said frame for reciprocation toward and away from the force receiving side of the force receiver to change the length of the material being tested, means for reciprocating the member, a graduated bar mounted from said force receiver parallel to the reciprocable member, an adjustable slider movable along the bar and cooperating with the graduations, and a graduated indicating member carried on the reciprocable member and adapted to engage the slider, said indicating member, slider, and graduated bar being adapted to preset the distance between the force receiver and the reciprocable member to correspond to the length at which the material is to be tested, said bar being graduated in increments generally equal to the total of all the increments of the indicating member whereby the slider and bar determine the major portion of the length at which the material is to be tested, and the indicating member and the slider engaged thereby determining the minor portion of the test length.

10. A device according to claim 9 including a second graduated indicating member on the reciprocable member adapted to engage the force receiver when the length of the material has been changed to the length at which it is to be tested.

11. A device according to claim 10 in which the second graduated indicating member is in close proximity to the indicating means cooperating with the force offsetting means to facilitate reading the indication of the force required to change the length of the material to the prescribed test length when the second graduated indicating member indicates that the length of the material has been changed to the test length.

References Cited in the file of this patent

UNITED STATES PATENTS

| | | |
|---|---|---|
| 1,874,780 | McGuckin | Aug. 30, 1932 |
| 2,170,197 | Gumprich | Aug. 22, 1939 |
| 2,407,591 | Walley et al. | Sept. 10, 1946 |
| 2,458,704 | Hem | Jan. 11, 1949 |

FOREIGN PATENTS

| | | |
|---|---|---|
| 732,071 | Germany | Feb. 20, 1943 |